US007885853B2

(12) United States Patent
Mao

(10) Patent No.: US 7,885,853 B2
(45) Date of Patent: Feb. 8, 2011

(54) SYSTEM AND METHOD FOR HYBRID SINGLE AND AGGREGATION SALE

(76) Inventor: Yi Mao, 8100 Cambridge St., Houston, TX (US) 77054-3171

( * ) Notice: Subject to any disclaimer, the term of this patent is extended or adjusted under 35 U.S.C. 154(b) by 1219 days.

(21) Appl. No.: 11/429,778

(22) Filed: May 8, 2006

(65) Prior Publication Data
US 2006/0253394 A1 Nov. 9, 2006

Related U.S. Application Data

(60) Provisional application No. 60/678,378, filed on May 7, 2005.

(51) Int. Cl.
G06Q 30/00 (2006.01)
(52) U.S. Cl. ............ 705/14.34; 705/26; 705/14.1
(58) Field of Classification Search ......... 705/14.1, 705/14.34, 26, 27
See application file for complete search history.

(56) References Cited

U.S. PATENT DOCUMENTS

| 5,642,279 | A | * | 6/1997 | Bloomberg et al. ...... 705/14.34 |
| 6,029,141 | A | * | 2/2000 | Bezos et al. ................ 705/27 |
| 6,049,778 | A | * | 4/2000 | Walker et al. ............ 705/14.14 |
| 6,269,343 | B1 | | 7/2001 | Pallakoff |
| 6,578,011 | B1 | | 6/2003 | Forward |
| 6,631,356 | B1 | | 10/2003 | Van Horn et al. |
| 6,735,572 | B2 | | 5/2004 | Landesmann |
| 2002/0032621 | A1 | | 3/2002 | Smith et al. |
| 2002/0065735 | A1 | * | 5/2002 | Hatakama et al. ............ 705/26 |
| 2002/0069118 | A1 | * | 6/2002 | Zylstra ..................... 705/26 |
| 2002/0107773 | A1 | * | 8/2002 | Abdou ..................... 705/37 |
| 2003/0126040 | A1 | | 7/2003 | Mesaros |
| 2005/0021457 | A1 | * | 1/2005 | Johnson et al. ............ 705/39 |
| 2006/0129454 | A1 | * | 6/2006 | Moon et al. ............... 705/14 |

OTHER PUBLICATIONS

Anon., "Feith Offers Attractive Package for Retailers," PR Newswire, Apr. 12, 1999.*
Maza, J., "Next Generation E-Business Solutions," Los Angeles Business Journal, vol. 22, No. 51, p. 25, Dec. 18, 2000.*
Anon., "Shiseido to Adopt New Price System with Dept. Stores," Nikkei Net Interactive, Jun. 16, 2001.*

* cited by examiner

Primary Examiner—Nicholas D Rosen
(74) Attorney, Agent, or Firm—Polster, Lieder, Woodruff & Lucchesi, L.C.

(57) ABSTRACT

The present disclosure provides a system and method for aggregating sales of a product. The aggregated sales provide that a rebate based upon the sales of the product within a window of time is later provided to the buyer.

12 Claims, 18 Drawing Sheets

Implicit Price Calculate Process

| Implicit Style 50 |
| Explicit Style 60 |

| Item Picture 15 |

| Item Description 10 |

>= 1 Item Price: $$$$
>=XX Item Price: $$$
>=XXX Item Price: $$
>=XXXX Item Price: $
20

| Total Item Offer: | 25 |

| Deal start date: | 30 |

Deal end date disable in implicit mode):
40

| Notification threshold: | 70 |

Only available in Implicit Style

| Cleanout activation threshold: | 75 |

Choice:
1. as soon as possible
2. wait xxx hours if seller has not confirmed on notification threshold event
78

Cleanout Price:
80

| Submit 85 |

Seller submit information page
Fig 2

Explicit Deal Information Page

| Item Picture 100 | Membership A 130 | Price:$$$$ | 140 |
|---|---|---|---|
| | Membership B 130 | Price:$$ | 140 |
| | Membership C 130 | Price:$$ | 140 |
| | Membership D 130 | Price:$ | 140 |

| Item Description 110 | | |
|---|---|---|
| >= 1 Item Price: $$$$<br>>=XX Item Price: $$$<br>>=XXX Item Price: $$<br>>=XXXX Item Price: $<br>120 | Today Sold: | 145 |
| | Total Item Offer: | 150 |
| | Item Number Left: | 155 |
| | Cleanout Price: | 158 |
| | Deal start date: | 160 |
| | Current date:: | 161 |
| | Buy | 170 |

Implicit Deal Information Page
Fig 4

LOGIN

UserName  180          xxxxx

Password  185          XXXXXXXXX

I am NOT the member
I want to join as a member  190

Log In
Fig 5

| | |
|---|---|
| Purchase Quantity: 200 | xxx |
| Total Price: 205 | Xxx.xx |
| | Update 210 |
| Credit Type: 215 | xxxx |
| Credit Number: 220 | Xxxx-xxxx-xxxx-xxxx |
| Secure Number: 225 | Xxx-xxxx |
| Ship address1 230 | xxxxxxxxx |
| Ship address2 235 | xxxxxxxx |
| City 240 | xxxxxxx |
| State/Prince 245 | xxxxxxx |
| Zip 250 | xxxxxxx |
| Country 260 | xxxxxxxxxx |
| | CheckOut 265 |

Check Out
Fig 6

Server Processes

Order Process I

Order Process II

Order Process III

Rebate Process

Implicit Price Calculate Process

Explicit Price Calculate Process

| Deal ID (1000) | Seller (1100) | Product (1200) | Start Date (1300) | End Date (1400) | Quantity (1500) | Pricelist (1600) | MODEL (1700) | Notify threshold (1800) | Cleanout Threshold (1900) | Cleanout Price (2000) |
|---|---|---|---|---|---|---|---|---|---|---|
| 1(1001) | 30max.Com (1101) | Toshiba E312 (1201) | 10/12/2004 (1301) | 11/10/2001 (1401) | 500 | if( num >=1 ) price is $345<br>if(num >= 50) price is $330<br>if(num >= 100) price is $315<br>if(num >= 200) price is $300<br>(1601) | Explicit (1701) | 100 (1801) | n/a | n/a |
| 2(1002) | 30max.Com | Toshiba E330 | 11/10/2004 | 11/30/2004 | 300 | if(num >= 1) price is $345<br>if(num >= 150) price is $300<br>if(num >= 300) price is $290<br>(1602) | Explicit | n/a | n/a | n/a |
| 3(1003) | 30max.Com (1103) | Toshiba E330 (1203) | N/A(1303) | N/A(1403) | 334 (1503) | if(num >= 1) price is $345<br>if(num >= 50) price is $330<br>if(num >= 200) price is $300<br>(1603) | Implicit (1703) | 100 (1803) | 50 condition: 24hours (1903) | $330.00 (2003) |

Seller table       Fig 14

| Customer 2100 | Deal ID 2200 | Aggregation Period 2300 | Order Time 2400 | Quantity 2500 | Single Item Price 2600 | Prepaid Total 2700 | Aggregation sold Number 2800 | Final Aggregation Price 2900 | Rebate Credit 2950 |
|---|---|---|---|---|---|---|---|---|---|
| Alex Donald (2101) | 1 | 7 (2301) | 10/12/2004 (2401) | 1 | $345.00 (2601) | $345.00 (2701) | 102 | $315.00 | $30.00 (2951) |
| Ben Ellen (2102) | 1 | 7 | 10/25/2004 | 1 | $345.00 | $345.00 | 102 | $315.00 | $30.00 |
| Collin Fuller (2103) | 1 | 7 | 11/10/2001 | 1 | $345.00 | $345.00 | 102 | $315.00 | $30.00 |
| Bob sander (2104) | 1 | 15 | 10/12/2004 | 1 | $345.00 | $345.00 | 212 | $300.00 | $45.00 |
| Cathy dell (2105) | 1 | 15 | 10/25/2004 | 1 | $345.00 | $345.00 | 212 | $300.00 | $45.00 |
| Nancy Mig (2106) | 1 | 15 | 11/10/2001 | 1 | $345.00 | $345.00 | 212 | $300.00 | $45.00 |
| Ted Luck (2107) | 1 | 30 | 10/12/2004 | 1 | $345.00 | $345.00 | 334 | $300.00 | $45.00 |
| Lillian Kevin (2108) | 1 | 30 | 11/10/2001 | 1 | $345.00 | $345.00 | 334 | $300.00 | $45.00 |
| | | ...... | | | | | | | |
| Daniel Jack (2109) | 3 | 7 | 10/12/2004 | 1 | $345.00 | $345.00 | 53 | $330.00 | $15.00 |
| Emma Natasha (2110) | 3 | 7 (2110) | 10/25/2004 (2310) | 1 | $345.00 | $345.00 | 98 | $330.00 (2910) | $.0015 (2960) |
| Olive Jean (2111) | 3 | 7 | 11/10/2001 | 1 | $345.00 | $345.00 | 71 | $330.00 | $15.00 |
| Frank Len (2112) | 3 | 15 | 10/12/2004 | 1 | $345.00 | $345.00 | 163 | $330.00 | $15.00 |
| Kevin Dean (2113) | 3 | 15 | 10/25/2004 | 1 | $345.00 | $345.00 | 212 | $330.00 | $15.00 |
| Gracie Tailor (2114) | 3 | 15 | 11/10/2001 | 1 | $345.00 | $345.00 | 180 | $330.00 | $15.00 |
| Henry Mile (2115) | 3 | 30 | 10/12/2004 | 1 | $345.00 | $345.00 | 334 | $300.00 | $45.00 |
| Jeff Steven (2116) | 3 | 30 | 11/10/2001 | 1 | $345.00 | $345.00 | 334 | $300.00 | $45.00 |
| Sam Daily (2217) | 3 | 1 (2317) | 10/12/2004 (2417) | 1 (2517) | $345.00 (2617) | $345.00 (2717) | 8(2817) | $345.00 (2917) | 0 (2977) |
| Jack Mackin (2218) | 3 | 1 (2318) | 10/22/2004 (2418) | 1 (2518) | $345.00 (2618) | $345.00 (2718) | 23(2818) | $345.00 (2918) | 0 (2978) |

Buyer Table     Fig 15

| DATE | UNIT SOLD | Total unit sold (7 days aggregation After Order Date) | Implicit mode Aggregation Sold Number (7 Days) |
|---|---|---|---|
| 10/12/2004(3001) | 5(501) | 53 | 53 |
| 10/13/2004 | 3(502) | 71 | 71 |
| 10/14/2004 | 7(503) | 84 | 84 |
| 10/15/2004 | 2(504) | 91 | 91 |
| 10/16/2004 | 12(505) | 95 | 95 |
| 10/17/2004 | 15(506) | 100 | 100 |
| 10/18/2004 | 9(507) | 93 | 100 |
| 10/19/2004(3002) | 23(508) | 98 | 100 |
| 10/20/2004 | 16(509) | 87 | 100 |
| 10/21/2004 | 14(510) | 84 | 100 |
| 10/22/2004 | 6(511) | 81 | 100 |
| 10/23/2004 | 17(512) | 96 | 100 |
| 10/24/2004 | 8(513) | 89 | 98 |
| 10/25/2004(3003) | 14(514) | 91 | 98 |
| 10/26/2004 | 12(515) | 96 | 96 |
| 10/27/2004(3004) | 13(516) | 102 | 102 |
| 10/28/2004 | 11(517) | 96 | 102 |
| 10/29/2004 | 21(518) | 90 | 102 |
| 10/30/2004 | 10(519) | 84 | 102 |
| 10/31/2004 | 10(520) | 86 | 102 |
| 11/1/2004(3005) | 19(521) | 87 | 102 |
| 11/2/2004 | 18(522) | 86 | 102 |
| 11/3/2004 | 7(523) | 70 | 96 |
| 11/4/2004 | 5(524) | 71 | 90 |
| 11/5/2004 | 15(525) | 66 | 87 |
| 11/6/2004 | 12(526) | 51 | 87 |
| 11/7/2004(3006) | 11(527) | 39 | 87 |
| 11/8/2004 | 18(528) | 28 | 86 |
| 11/9/2004 | 2(529) | 10 | 71 |
| 11/10/2004 | 8(530) | 8 | 71 |
| Max | 23 | | 102 |
| Total | 334 | | |

Exemplary Implicit style Aggregation Sold Table 7 Days

Fig. 16

| DATE | UNIT SOLD | total unit sold (15 days aggregation After the order date) | Aggregation Sold Number (15 Days) |
|---|---|---|---|
| 10/12/2004(3101) | 5(501) | 163 | 163 |
| 10/13/2004 | 3(502) | 171 | 171 |
| 10/14/2004 | 7(503) | 179 | 179 |
| 10/15/2004 | 2(504) | 193 | 193 |
| 10/16/2004 | 12(505) | 201 | 201 |
| 10/17/2004 | 15(506) | 199 | 201 |
| 10/18/2004 | 9(507) | 203 | 203 |
| 10/19/2004(3102) | 23(508) | 212 | 212 |
| 10/20/2004 | 16(509) | 196 | 212 |
| 10/21/2004 | 14(510) | 185 | 212 |
| 10/22/2004 | 6(511) | 186 | 212 |
| 10/23/2004 | 17(512) | 192 | 212 |
| 10/24/2004 | 8(513) | 186 | 212 |
| 10/25/2004(3103) | 14(514) | 196 | 212 |
| 10/26/2004 | 12(515) | 184 | 212 |
| 10/27/2004(3104) | 13(516) | 180 | 212 |
| 10/28/2004 | 11(517) | 167 | 212 |
| 10/29/2004 | 21(518) | 156 | 212 |
| 10/30/2004 | 10(519) | 135 | 212 |
| 10/31/2004 | 10(520) | 125 | 212 |
| 11/1/2004 | 19(521) | 115 | 212 |
| 11/2/2004(3105) | 18(522) | 96 | 212 |
| 11/3/2004 | 7(523) | 78 | 196 |
| 11/4/2004 | 5(524) | 71 | 196 |
| 11/5/2004 | 15(525) | 66 | 196 |
| 11/6/2004 | 12(526) | 51 | 196 |
| 11/7/2004 | 11(527) | 39 | 196 |
| 11/8/2004 | 18(528) | 28 | 196 |
| 11/9/2004 | 2(529) | 10 | 184 |
| 11/10/2004 | 8(530) | 8 | 180 |
| Max | 23 (3002) | | 212 |
| Total | 334 | | |

Exemplary Implicit style Aggregation Sold Table 15 Days

Fig 17

| | Membership Aggregation Sold Number (1 Days) (3500) | 23 |
|---|---|---|
| Explicit Style | Membership B Aggregation Sold Number (7 Days) (3600) | 102 |
| | Membership C Aggregation Sold Number (15 Days) (3700) | 212 |
| | Membership D Aggregation Sold Number (30 Days) (3800) | 334 |

Exemplary Explicit Style Aggregation table

Fig. 18

SYSTEM AND METHOD FOR HYBRID SINGLE AND AGGREGATION SALE

RELATED APPLICATIONS

The present application claims priority to U.S. Provisional Patent Application No. 60/678,378, filed May 7, 2005, the contents of which are incorporated herein by reference.

FIELD OF THE INVENTION

This invention relates to electronic commerce providing a system and method for taking individual orders from individual buyer into group purchasing.

BACKGROUND OF THE INVENTION

Electronic commerce benefits the buyer with advantages on purchasing power. With online information abundant, buyers can easily locate sellers who offer the lowest price. Different websites various methods for promoting goods or services online, for example, bidding systems as with ebay.com, buyers naming their price as with priceline.com, the traditional store style where products are offered for set prices, the sellers naming their price through a third party stores as with amazon.com and conditional aggregation systems that group individual potential buyers to achieve low price under certain conditions.

The bidding system, as ebay.com, offers an auction channel for sellers. Today, small business owners are actively sellers, and they create multiple bidding items for sale online and accept the bid price at the end of auction for sale of the item. The traditional online store as amazon.com, offers competitive price to attract the buyers. The buyer naming price style as priceline.com offers an alternative way to buy goods and services. The order is taken when there is a seller that agrees with the buyer's price. The conditional aggregation style aggregates individual orders, and the contract is implemented when the condition is met.

The present system provides the style of hybrid—store style with aggregation capability. The bidding system, traditional store style and the buyer naming price style don't have the aggregation capability; the final aggregation price depends on the desirability. Though the auction system offers a Dutch auction variant to have multiple item sales, the price is not determined by aggregation purchasing but the desirability of product itself. Additionally, the bidder has to wait a long period until the auction is end.

The conditional aggregation style does offer the aggregation capability, but both participants to the sale uncertainty as to whether the sale will ever be completed. Only when condition is met is the deal fulfilled. The buyer, who is eager to receive the product, has to wait until the deal is expired or consummated before receiving the item because the deal won't complete until the minimum condition is met. Therefore, this method is less attractive despite the fact that a lower price for purchasing the item may be achieved. Additionally, dynamic market conditions could lower the price and attract buyers away from the deal. Buyers withdrawing from the order before consummation or expiration will inevitably happen, and the whole deal may be cancelled because due to order cancellation. This will leave the buyer without a product, and the seller without a sale. Seller will also have increased inventory cost. Therefore, this method of sales is undesirable.

The present invention takes the desirability and quantity into the consideration and provides a new method to aggregate individual sales to achieve a lower sale price for the buyer. The present invention provides a new channel for individual, small business owners and manufactures to sell directly to a consumer. It enables a seller to promote items at low prices and compensate with large sale volumes. Individual items are sold when a buyer orders. In other words, the sellers make the sale immediately when buyers place the order. Seller performs shipping and handling after the order is confirmed. Unlike auction or conditional aggregation style, Buyer does not need to wait until the meeting of a specified condition for the deal to end. Buyers also enjoy lower prices by aggregating the individual sales into group purchasing. Buyers prepay the retail price up front and later the system aggregates the sales and lower the prices. The differences between prepaid and the price after aggregation will be credited into the customer account. The system works like a traditional store with the additional feature of group aggregation. This creates win-win situation for the buyer and the seller.

SUMMARY OF THE INVENTION

The present invention provides a method, and a system for performing the method, of aggregating sales of a product. The method comprises the steps of displaying product information to a buyer including a price, charging the price to the buyer and shipping the item to buyer in response to the buyer selecting the product for purchase, and providing a rebate to the buyer, the rebate calculated by determining the aggregation of sales of the product to the buyer and to other buyers occurring over a time period and comparing the aggregated sales number to a price sheet listing aggregated sales numbers cross-referenced to discounted sales prices.

BRIEF DESCRIPTION OF THE DRAWINGS

FIG. 2 is the seller summit product page includes two selling styles.

FIG. 4 is implicit selling style elements on webpage.

FIG. 5 is user-logging page.

FIG. 6 is check out page contain with quantity number to purchase, ship info and credit info.

FIG. 14 is the example data of seller table.

FIG. 15 is the example data of buyers table.

FIG. 16 is the daily sold record table for aggregation period 7 days.

FIG. 17 is the daily sold record table for aggregation period 15 days.

FIG. 18 is the table shows the result of explicit style.

DETAILED DESCRIPTION OF THE PREFERRED EMBODIMENT

Figure 1:
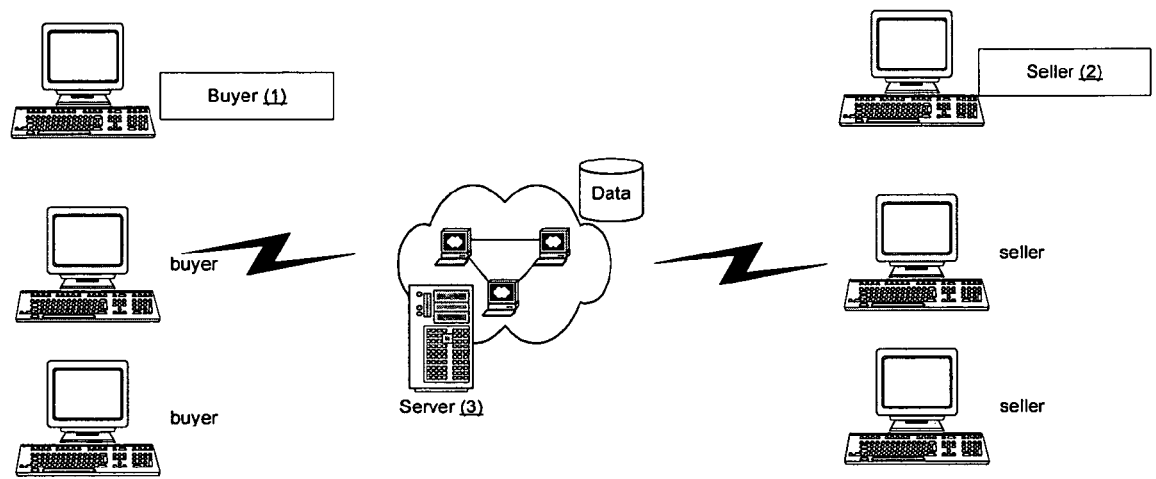
FIG. 1 is a diagram of the system according to a preferred embodiment of the present invention.

For an understanding of the preferred embodiment of the present invention, one must understand the following terminology:

1. Deal: represents the sale submitted by seller.
2. Aggregation period: the certain days to aggregate the sale. Every buyer belongs to a membership, different membership represents different aggregation periods.
3. Price list: the seller submits to the system, defines what price would be given if the item sold above certain quantity. The price list states the relationship between the number units sold and price offering.
4. Bulk price: the product's price. The quantity that a buyer orders qualifies for specific price points. For example, the price list offers a price of $15.00 per unit if the ordered quantity is greater then or equal to one. If the order greater than or equal to fifty, then the price would be $10.00 per unit.
5. Single item price: by default, the seller's price list lists a single unit price. Sellers must define the single unit price. This is the price per unit that the buyer paid up front. If the buyer bought purchases a higher quantity, the buyer qualifies for the bulk price, and the bulk price is charged per unit. After Cleanout activates, the single item price would be the price whichever less between the cleanout price and bulk price.
6. Final aggregation price: the final price is given to the consumer after aggregating sold items. The final aggregation price is the price according to the price list that will be applied based upon the total number of units sold.
7. Rebate waiting period: considering the shipping and possible return of the item, the rebate waits for a specified amount of time to pass.
8. Notify Threshold: when current number of items available to be sold goes below a threshold, the server would notify the seller. In response, the seller might or might not take action to confirm more items are available for sale and update the total item number.
9. Cleanout activation threshold: the system activates the cleanout price when the item sold are below a specified number. Instead of a single unit price, stated in the price list, the buyer prepays the cleanout price per unit after the cleanout option is activated.
10. Secondary aggregation number: the second aggregation number next to the single unit price in the price list.
11. Secondary aggregation price: the second aggregation price next to the single unit price in the price list. For instance, the seller's price list is: if sold number equal to or greater than one unit, price is $10.00, if sold number greater than or equal to 50 units, price is $9.00. Here 50 units are secondary aggregation number. A price of $9.00 is the secondary aggregation price.

The preferred embodiment of the present invention provides a system and method for accepting a seller's price list, calculating the aggregation price based upon demand, and crediting the difference back to user's account. The users are categorized into different aggregation periods via joining the different memberships. Depending on the business need, the aggregation period is defined by the implementer's decision. For illustration purpose, the example in this description defines four categories—membership A is 1 day, membership B is 7 days, membership C is 15 days and membership D is 30 days.

The system is divided into two styles: the explicit style and implicit style. Referring to FIG. 2, explicit style is a method which enables sellers to define the following information: a product description (10), a product picture (15), a price list (20), a total number offered (25), a deal start time (30), a deal end time (40), and a notification threshold (70) is optional.

Implicit style is a method that enables a sale without defining a deal end time. The seller provides the product description (10), the product picture (15), the price list (20) and the total number offer (25). For implicit style, the following information is optional: the deal start time (30), the notification threshold (70), a cleanout activation threshold (75) and a cleanout price (80). Implicit style continues to sell the product until current inventory is sold out, and that is why the start time and end time are not necessarily needed. In implicit style, the start time could be default to be the timestamp when system publishes the request online (i.e. immediately).

The buyers purchase or are awarded the aggregation period time via joining a membership. Different memberships represent the different periods time for the aggregation period. The final aggregation price is calculated using the number of units sold during the defined aggregation period.

Explicit style takes the maximum-sold record during the whole deal period. Buyers all pay the same price if they are entitled to the same membership, so there is no need of price match in explicit style. Implicit style has price differences for different buyers depending upon when the buyer places his order, so price match may be given to the disadvantaged buyer, the early buyer and latest buyers.

If sale style is implicit, the implicit phenomena appear: a display of the number of items remaining is provided, the final aggregation price might or might not be shown above the secondary aggregation price. In another view, when the number of items currently left is below the secondary aggregation number, the buyers who anticipate the purchase are disadvantaged buyer. To encourage the buyer to continue in his order, the optional cleanout price is promoted to guarantee that remaining items are sold.

The system receives the information from the seller when placing the item and creates the deal page online. If the buyers decide to purchase, the buyer logs into the system, places the order, provide the shipping address and credit or bank account, and pays the amount of a single item price multiplied by the order quantity.

When the seller confirms the payment from the buyer, the seller handles and ships the product to the buyer within an agreement time frame.

After the rebate waiting period, the system aggregates the individual sale into the group, calculates the final aggregation price based on the buyer's aggregation period and seller's price list, and the difference between the final amount and paid amount is credited back to the user's credit card or bank account or their account with the merchant.

Explicit style has an advantage or implicit style in that the final aggregation price of the item is irrelevant to order date. Different membership levels entitle every buyer the same price regardless of when the buyer placed the order because the final price is determined the number of items sold after the expiration of a defined period. Price match is not an issue.

A disadvantage of explicit style is that the seller clearly specifies when the deal will be expired, and when that time has passed, the deal is automatically ended despite the fact that items may remain unsold. If the seller wants to continue, the seller is required to resubmit the item with a new aggregation period. Additionally, the credit waiting period is longer in comparison to implicit style.

Implicit style has the advantage that the seller does not specify the aggregation period so that the deal does not expire. The deal ends only when the item is sold out.

In comparison to explicit style, the rebate process starts at an earlier time and credit waiting period is short.

A disadvantage of implicit style is that the different order dates might result in different in final aggregation prices for different buyers. As a result, price match is implemented in implicit style. The early buyer and latest buyer are disadvantaged buyer. Certain promotion should be taken to encourage the disadvantage buyers to purchase. For example, a guarantee discount price can be specified for the first 20 buyers, and a cleanout price can be specified for the last buyers to purchase. Moreover, in implicit style, the rebate waiting period may be shorter than explicit style's rebate waiting period because it is of a specified duration.

The rebate waiting period is a factor that may be determined by the implementer. If the return policy were separate from the aggregation price, which means when the buyer purchases the item and returns the item later, the aggregation price would not change because of the returning item.

In implicit style, the earliest rebate process might begin at the latest day of aggregation. For instance, if buyer A has membership B and the aggregation period is 7 day, buyer A place order on 20:15:23 1-1-2004, and the latest date of aggregation is 20:15:23 1-8-2004.

In explicit style, the earliest rebate process might starts after deal's end time.

The return policy may be a factor affecting the aggregation price. For example, when the buyer purchases and returns an item, the aggregation price might increase due to the returned item.

For implicit style, the earliest rebate process may start as late as the return policy time frame (defined by seller) plus the latest date of aggregation and the date consumer received shipping of the item.

The last day of aggregation date could be later than the date consumer received shipping. For instance, the buyer A has 30 day aggregation period, buyer A order on 20:15:23 1-1-2004, the last aggregation date is on 20:15:23 1-31-2004, buyer A received product on Jan. 12, 2004. For explicit style, the earliest rebate process starts after the return policy time frame plus the latest date between end of deal and the date last consumer received shipping.

As demonstrated as above, the rebate-waiting period is a factor that is determined by business considerations and negotiation, rather than a precise value. For example, the rebate waiting period might be defined by as much as a six to ten week period after the last day of aggregation period.

A hybrid aggregation purchase system may also be implemented using different membership categories. The different membership categories implement different aggregation periods. The longer the aggregation period, the larger the aggregation number will be. As a result, the final aggregation price will be less.

The system also need provide a system for individuals to purchase a membership. For example, the system offers different prices for different memberships.

Referring to FIG. 1, this is the diagram of a system according to the preferred embodiment. Buyers (1) and Sellers (2) are connected via a network. Clients include sellers and buyers utilizing the terminals, such as computer, laptops, interactive TV, personal digital assistants (PDAs), telephones communicating with the system server (3) over the network. The system server keep the records of buyer's and seller's information in a database, publishes the seller's product online and confirms the buyer's order. The network is preferably the world wild web, but the network is not so limited and may comprise merely a telephone network.

In FIG. 2, the seller may provide the elementary information for placing a product for sale on the system. Sellers must choose one of two selling styles: implicit style 50 and explicit style 60. Based upon this selection, information is submitted differently. This results in showing different information to the seller based upon the style of selling he has chosen and adopting different price calculation methods.

As discussed above, implicit style 50 is the style where the system continuously sells product without having a sale expiration day. Explicit style 60 is the style where the system is limited to product sale within a fixed time frame.

An item picture 15 is the item's picture provided by seller. An item description 10 is textual information describing the item's features. A price list 20 is the relationship between the aggregation sold unit number and price specified by the seller. A total item offer 25 is the total quantity of product offered by the seller. If the item is sold out, the deal will end regardless of whether the deal end time has occurred or not. The system may or may not publish information regarding completed sales.

A deal start date 30 is the deal's beginning time. In explicit style, the deal start date is published to the buyer. In implicit style, a deal start date is optional, and the default value is the time when system publishes information online. The default date and time format is HH:MM:SS MM-DD-YYYY.

A deal end date 40 is the deal's expiration time. The deal will end if deal end date has passed or the item is sold out. In explicit style, the deal end time is published on screen. In implicit style, there is no deal end date. The default format is HH:MM:SS MM-DD-YYYY.

Notification threshold 70 represents a point whereby the seller is informed that only a specified amount of product remains. When the amount of product is below the notification threshold, the system would notify the seller and the seller can take the opportunity to indicate that more product is available, if possible. It is optional for seller. If seller does not specify the value, then the system will not create the event to notify the seller.

Cleanout activate threshold 75 indicates the number of items remaining that will activate a cleanout price. If the quantity of product left is below the cleanout activate threshold, the system would activate the cleanout price and notify the seller. The default value is the secondary aggregation number. It is optional for seller, and is only available in implicit style. If seller does not specify a value, the system won't create the event to activate a cleanout price.

The activate condition choice 78 includes the options: "as soon as possible" means the activate cleanout when the current number of items left is below the cleanout activate threshold. "Wait for _____ hours for seller response to the notification threshold" means the system will wait up to a specified number of hours for a seller's response on notification threshold. Cleanout price 80 is the prepaid price after cleanout is activated. Default value is the secondary aggregation price. Cleanout price is only available when seller specifies the cleanout activate threshold. A submit button 85 is provided for submitting the information to server. Seller can login and change the deal information before the deal's expiration time.

Figure 3:
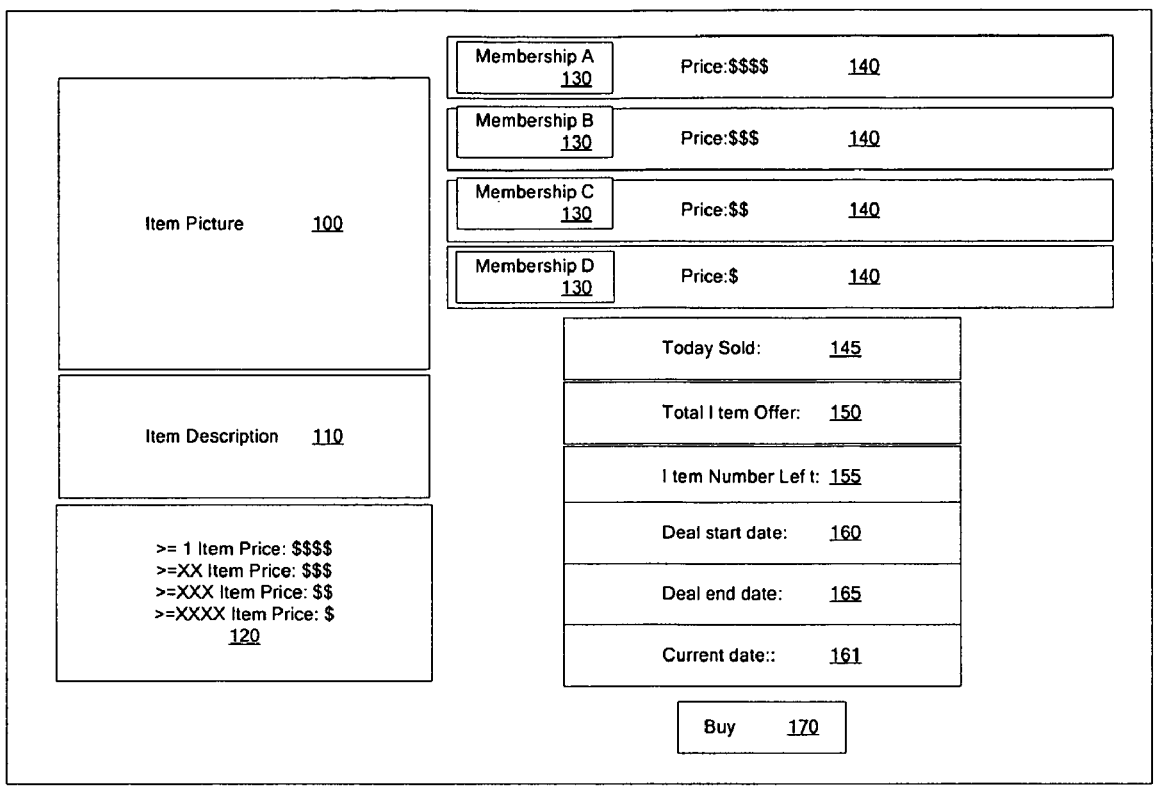
FIG. 3 is explicit selling style elements on webpage.

FIG. 3 is the diagram showing the explicit deal information online. When the seller logs into the system and chooses the explicit style to sell a product, the seller submits the following information: style (50 or 60, ref FIG. 14, 1700), Product description (10) and picture if available (15, ref FIG. 14, 1200), the Price List (20, ref FIG. 14, 1600), Total items offer—Quantity (25, ref FIG. 14, 1500), Deal start date (30, ref FIG. 14, 1300), Deal end date (40, ref FIG. 14, 1400) and Notification threshold (70, ref FIG. 14, 1800) is optional.

The server 3 receives the information submitted by seller, creates a record in a seller table in database. A Deal ID (1000) is a unique number generated to distinguish the deals submitted by sellers. As the FIG. 14 seller table shows, Deal ID 1 (1001) represents a deal record from seller 30max.com (1101), the product is Toshiba E330 PC handheld (1201). The deal starts at 12:00:00 Oct. 12, 2004 (1301), ends at 12:00:00 Nov. 10, 2001 (1401) with a quantity of 500 (1501).

The seller provides the price list (ref FIG. 14, 1601) as:

---
If (num >= 1) price is $345.00
If (num >= 50) price is $330.00
If (num >= 100) price is $315.00
If (num >= 200) price is $300.00.
--- and style the seller has chosen (1701) is Explicit. One hundred units is the notification threshold (1801). If left item number below the number 100, notify the seller, seller could have chance to confirm and update the total item offer number.

The system publishes the relevant information provided by the seller in corresponding field in a database. The server (3) dynamically updates the following information: membership correspondent price (140), today sold (145), item number left (155) and current date (161).

The seller will also specify the aggregation period for the various membership levels. For example:

Membership A Aggregation Sold Number (1 Days) 10
Membership B Aggregation Sold Number (7 Days) 50
Membership C Aggregation Sold Number (15 Days) 100
Membership D Aggregation Sold Number (30 Days) 120

According to the price list offer by seller, the deal ID 1's final aggregation price will be:

Membership A: $345.00.
Membership B: $330.00.
Membership C: $315.00.
Membership D: $315.00.

This information would publish based upon the viewing member's membership level.

FIG. 4 shows the implicit style deal's information published by the system. When sellers choose the implicit style to sell the product, the following information is submitted: product (description (10) and picture if available (15, ref FIG. 14, 1200), the Price List (20, ref FIG. 14, 1600), Total item offer, Quantity (25, ref FIG. 14. 1500), Deal start date (30, ref FIG. 14. 1300), Deal end date (40, ref FIG. 14, 1400), Style (50 or 60, ref FIG. 14, 1700), Notify Threshold (70, ref FIG. 14, 1800), Cleanout Activation threshold (75, ref FIG. 14, 1900), Cleanout Price (78), the condition choice (80, ref FIG. 14, 2000). Notify Threshold (70, ref FIG. 14, 1800), Cleanout Activation threshold (75, ref FIG. 14, 1900), Cleanout Price (78) and the condition choice (80, ref FIG. 14, 2000) are optional.

When the system receives the information, it creates a record in the database table, and a deal ID number distinguishes the deal submitted by the seller. As described above, the FIG. 14 seller table shows, ID 3 (1003) represents a deal record from seller 30max.com (1103), the product is Toshiba E330 PC handheld (1203). If the seller didn't submit the start time, the start time defaults to the earliest time system received the deal. The seller provides the price list (1603) as:

If item>=1 unit, the price is $345.00
If item>=50 unit, the price is unit $330.00
If item>=200 unit, the price is unit $300.00, The seller choice Style (1703) is Implicit, and one hundred units is the Notification threshold (1803). Fifty units is the default value of cleanout activation threshold. If the current number of items left is below the cleanout activation threshold, the cleanout process will activate (1903) in twenty-four hours unless the seller intervenes. $330.00 is the default value of cleanout price (2003).

If the left item number is below the number 100, notify the seller, and the seller could have chance to confirm and update the total number of items offered. If left number is below 50, the system sends another message to the seller that the cleanout condition is impending. If the seller has not responded to the notification threshold, the system check whether current time over 24 hours from the time system sent the notification. If yes, the cleanout process activates. After the cleanout price activates, the price of the item is adjusted from the single unit price to the next best pricing level is offered.

The system publishes that information in correspondent field at FIG. 4: Product description Toshiba E330 PC handhold (110), product picture if available (100), price list offered by seller is (120), If item>=1 unit, the price is $345.00
If item>=50 unit, the price is unit $330.00
If item>=200 unit, the price is unit $300.00, the total number of units offered is 334 units (150), the deal start time is 12:00:00 Oct. 12, 2004, the seller didn't specify a start time (therefore the start time is when the system publishes the deal online (160)). Moreover, the following information dynamically updates: membership correspondent price (140), number sold today (145), number of items left (155) and current date (161).

For example, if current aggregation sold number for each membership as following:

Membership A Aggregation Sold Number total (1 Days) 10 items
Membership B Aggregation Sold Number total (7 Days) 50 items
Membership C Aggregation Sold Number total (15 Days) 100 items
Membership D Aggregation Sold Number total (30 Days) 120 items The deal ID 1's current aggregation price will be:

Membership A: $345.00.
Membership B: $330.00.
Membership C: $330.00.
Membership D: $330.00.

This information would published on the membership correspondent price (140), FIG. 5 shows the login information for clients.

If wile viewing a product, the user decides to make a purchase, by clicking on a "BUY" (170) button, the system validate the user status. If the user has not logged, the user must do or become a member (190) if the user has no username (180) and password (185).

FIG. 6 shows the information that the user sees at checkout. After a user successful logs in, in FIG. 6 the buyer needs to provide the quantity (200) that the buyer wants to purchase, a shipping address (230-260) and credit card or bank account information (215-225).

The address is defaulted to be the address stored in membership information and credit card or bank information is defaulted to be the credit card or bank information provided by the buyer when joining, if any was provided.

If buyer wants to change the quantity, the buyer may modify the number in quantity field, and click on "update" (210). The system will then reflect the changes that the user made. The system also calculates the total price (205).

Figure 7:
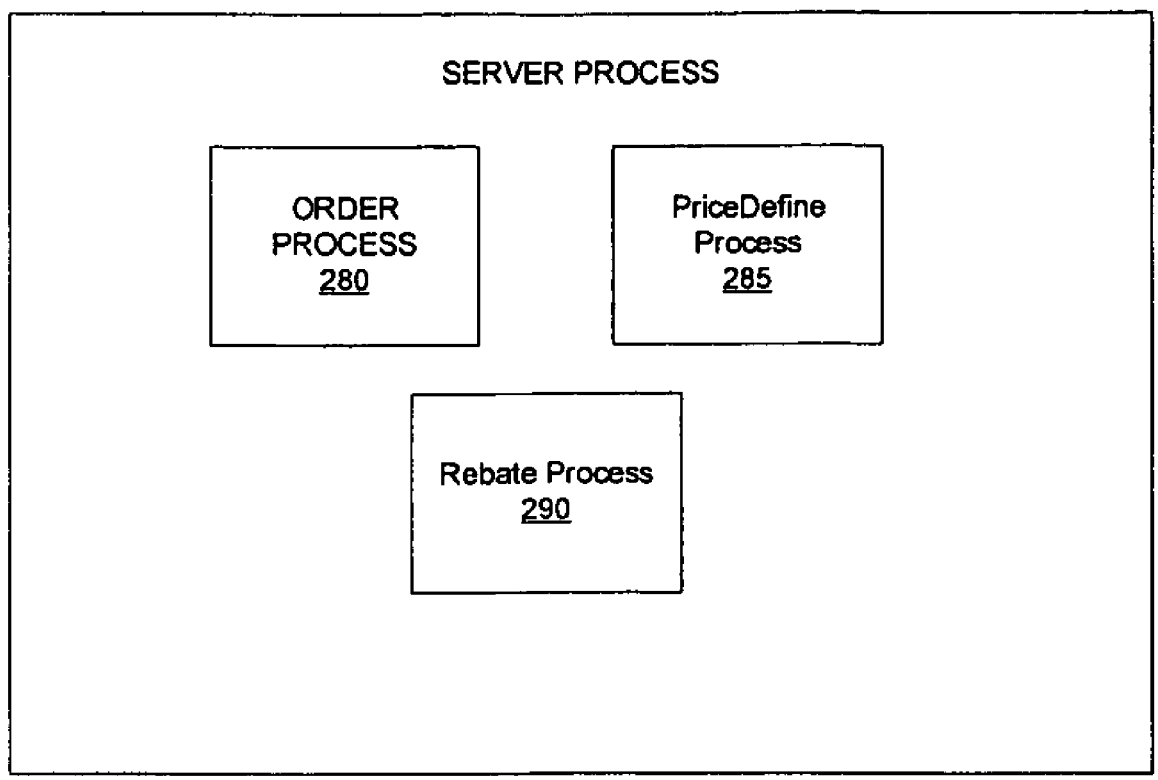
FIG. 7 is three major system processing.
Figure 8:
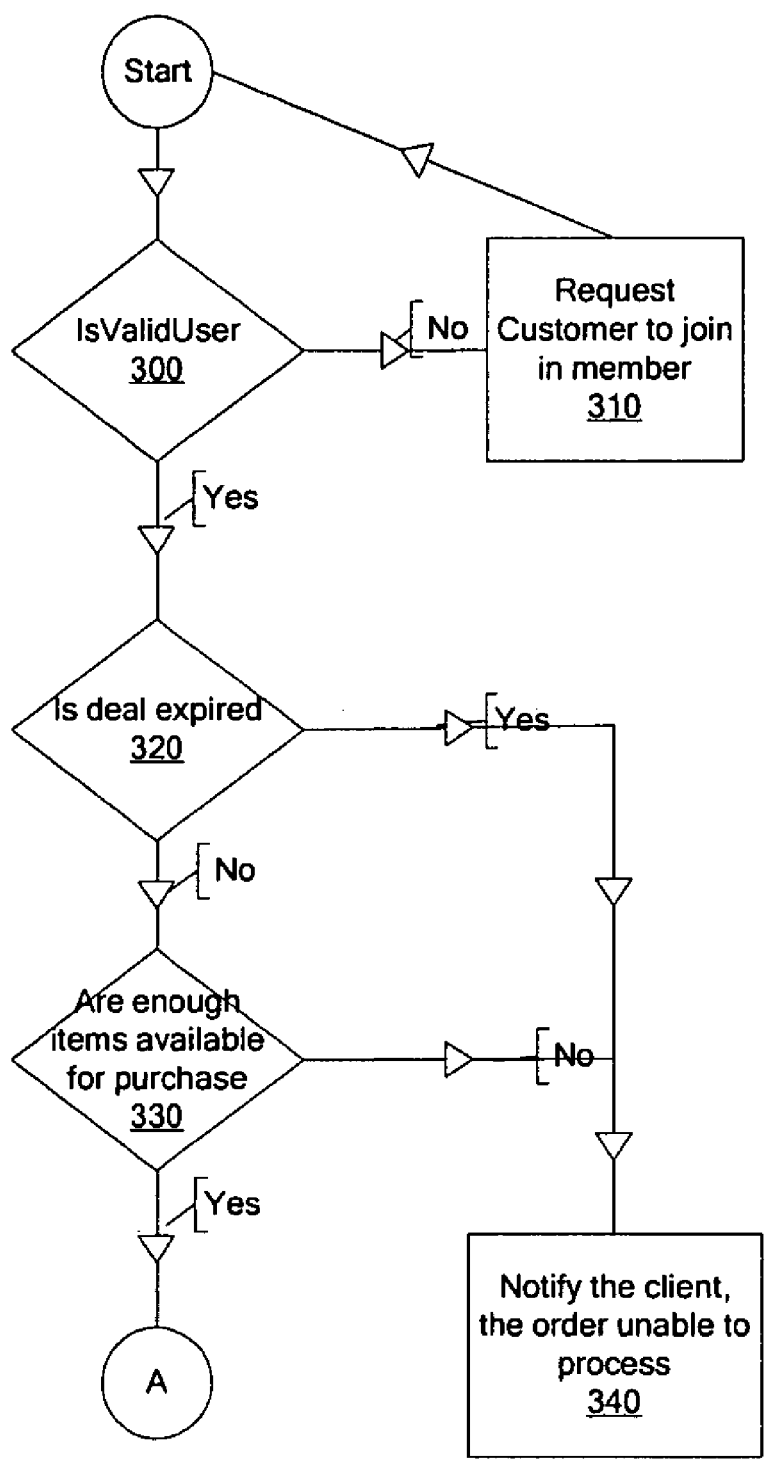
FIGS. 8-10 is the program flow diagram of system processing the order from the buyer.
Figure 9:
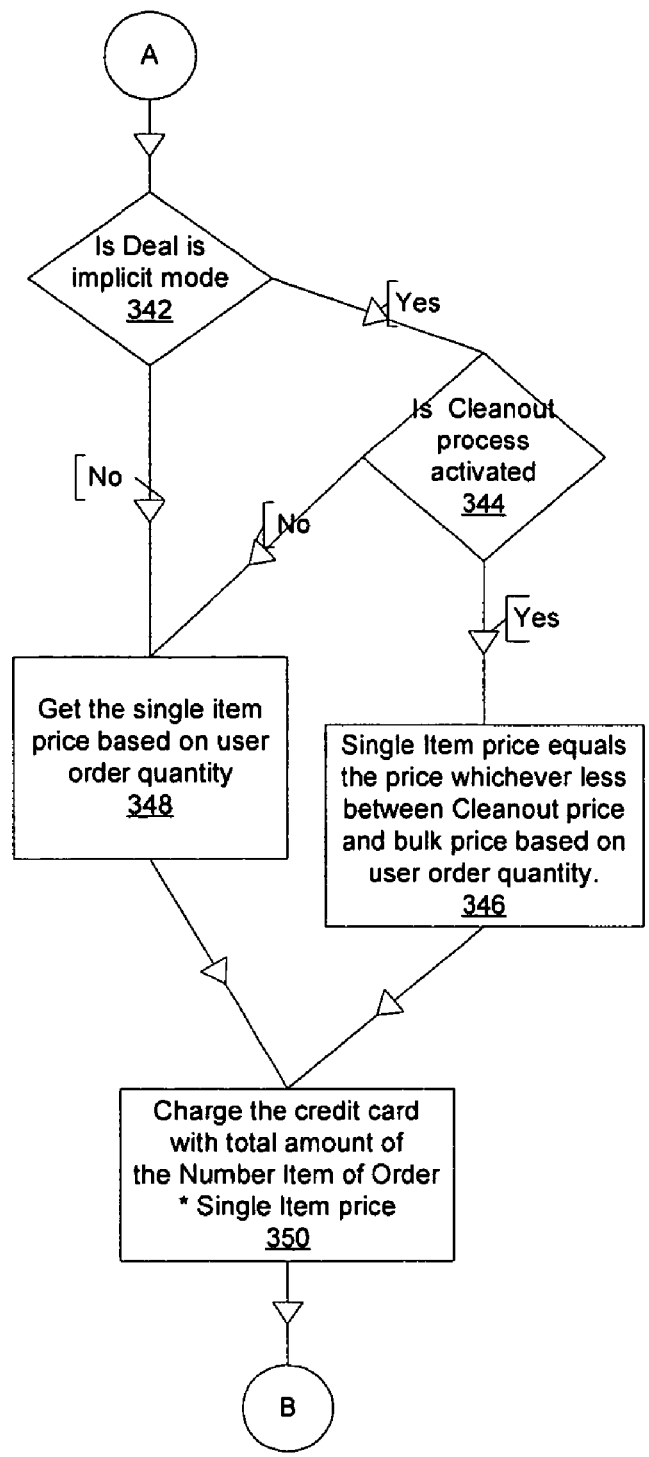
Figure 10:
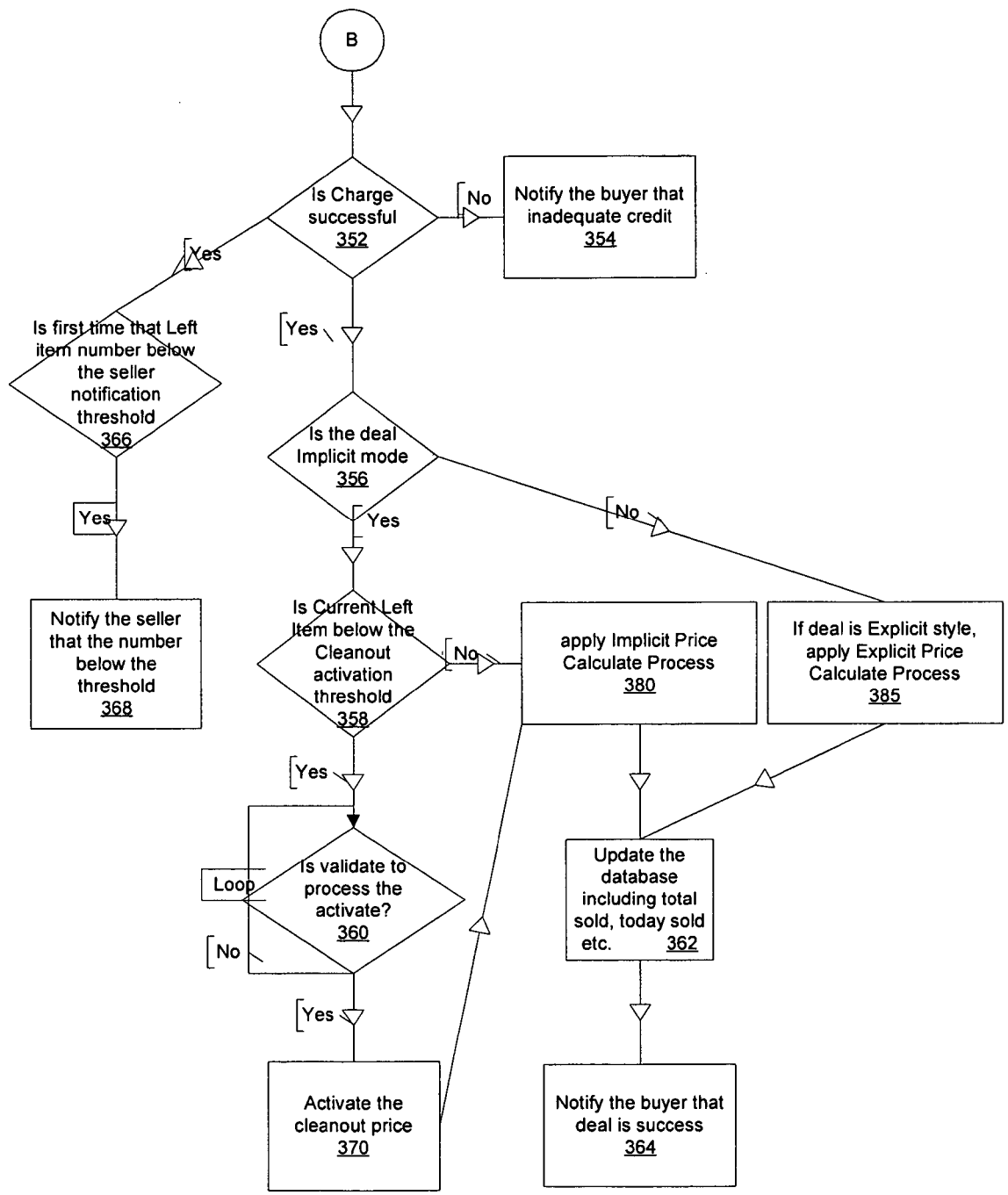
Figure 11:
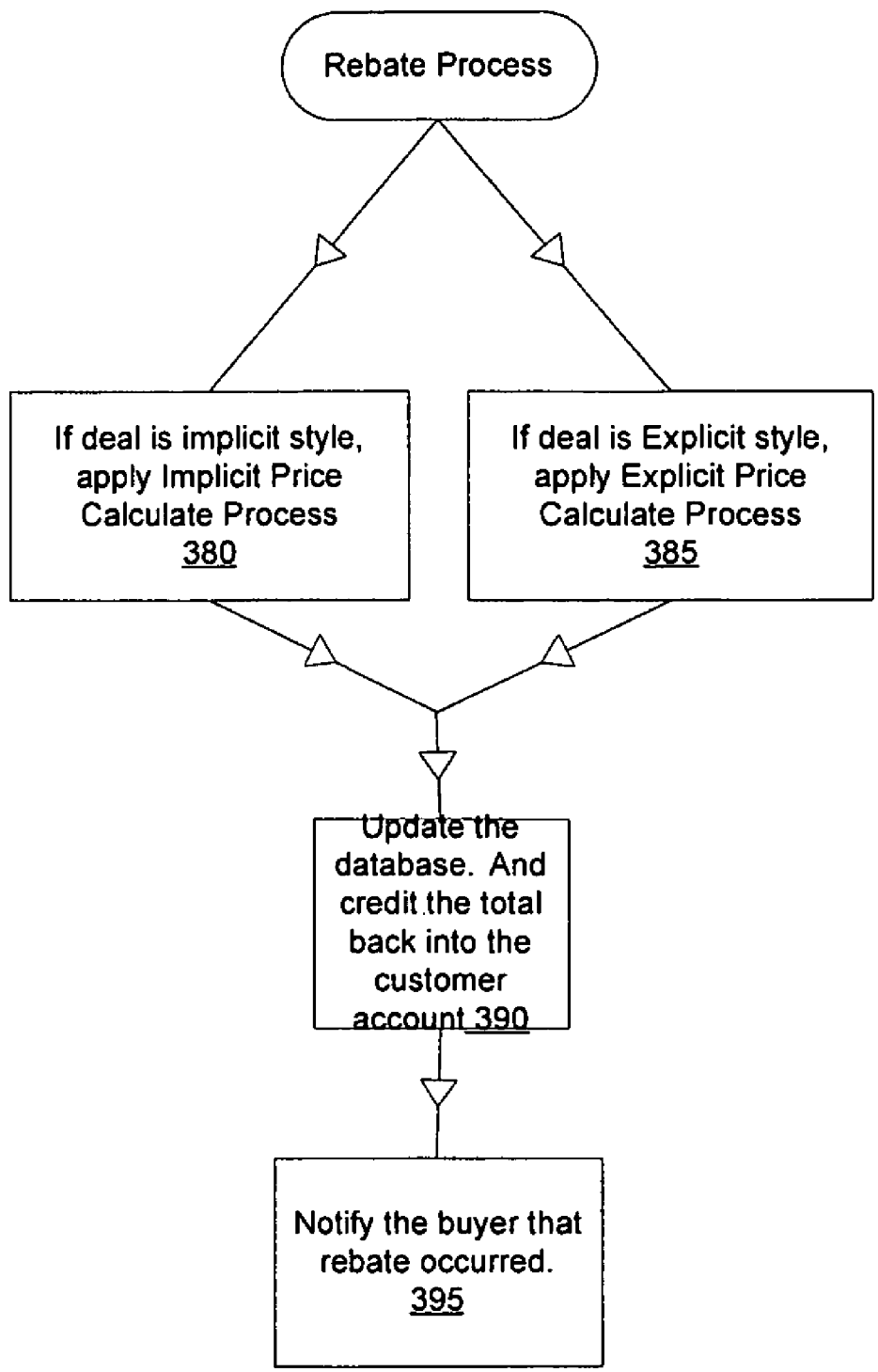
FIG. 11 is the rebate process.
Figure 12:
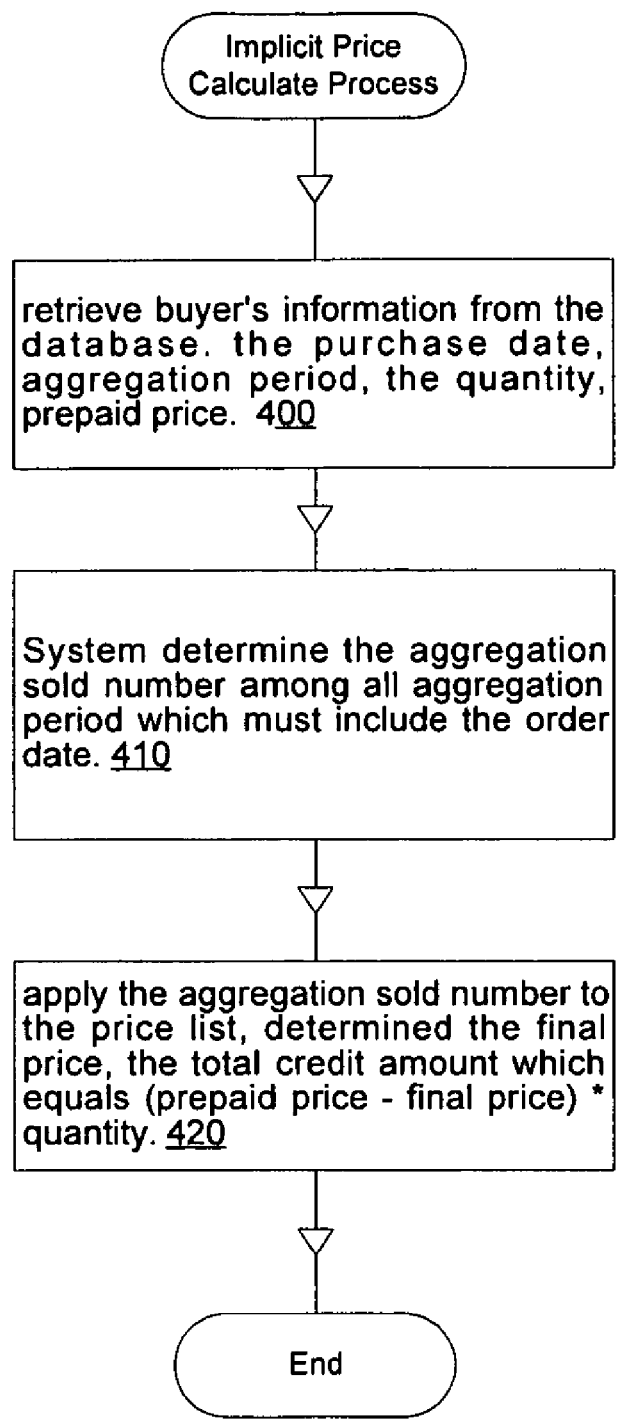
FIG. 12 is the program flow diagram of explicit price calculation process.
Figure 13:
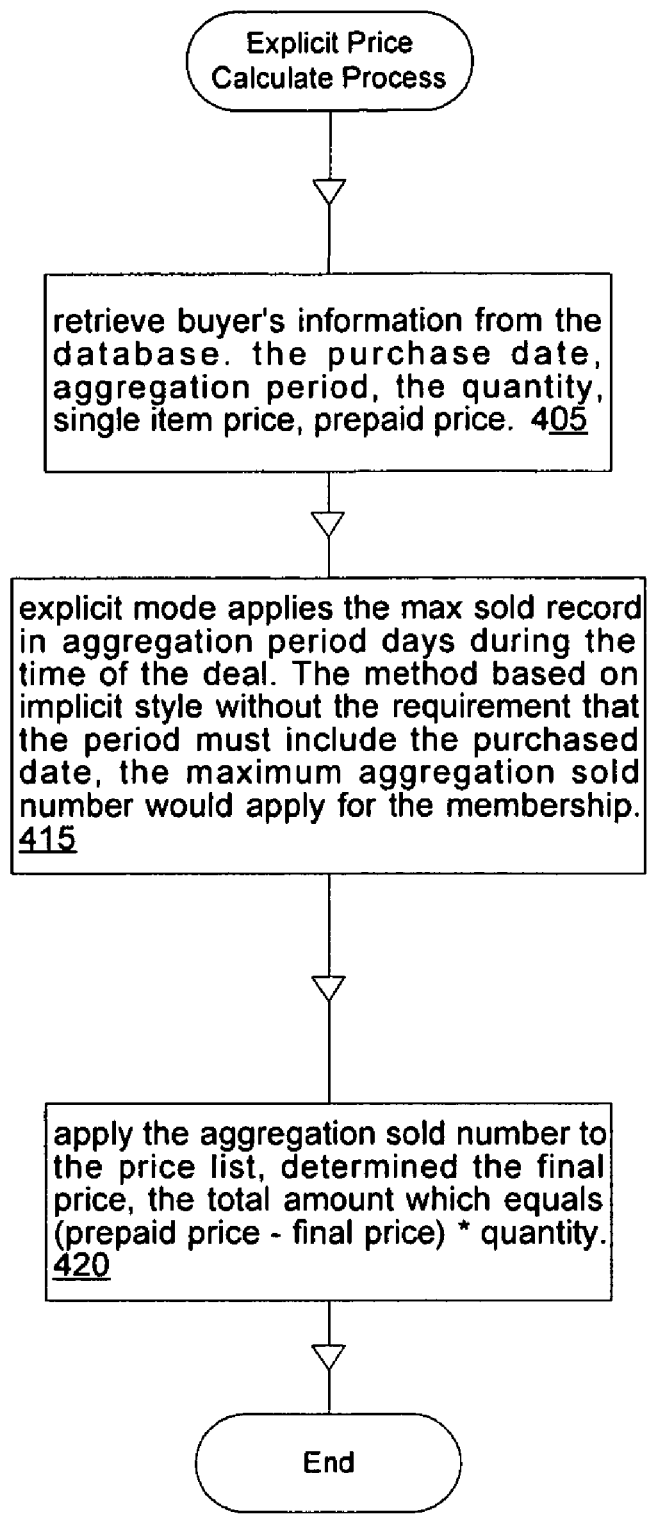
FIG. 13 is the program flow diagram of implicit price calculation process.

FIG. 7 demonstrates the three major processes in the server: the Order Process (280), Price Define Process (285) and Rebate Process (290). The Order Process is an order procedure, and the logic of the order process is shown in FIGS. 8-10. The Price Define Process is a procedure that calculates the item price dynamically. The price define process is shown in FIGS. 12 and 13. The Rebate Process is the process whereby the system credits back money to buyers after finalizing the item's aggregation price and is shown in FIG. 11.

After the buyer clicks the checkout (265), system receives the buyer's request and starts the order process as shown in FIG. 8. The system checks whether the user is a valid user (300), and if not, returns and notifies the error and asks the user to join the club (310). If the buyer is a valid user, the system verifies whether the deal is expired (320), if the deal is expired, the system notifies the user that the order cannot be processed because deal has ended (340).

If the deal has not expired, the system compares the quantity of buyers ordering and the number of available (330). If the quantity is valid and there are enough items for purchasing, the process continues to FIG. 9. Otherwise, the system notifies the buyer that there are not enough items for purchase and asks the buyer to modify the order quantity. Next, the system checks whether the style is the implicit style (342), and, if yes, the system checks whether the cleanout process has been activated (344). If yes, the price would be whichever is less between the cleanout price and the bulk price, depending on the buyer's order quantity (346). If the deal is explicit style, the system will get the single item price based on buyer's order quantity. If the buyer buys a large quantity and qualifies for a bulk price, the price is the bulk price stated in price list. Otherwise, the single item price would be the single unit price (348). Next, the system applies the total price to the credit card or bank information (350). The total price is the quantity purchased multiplied by the price.

Next, the process advances to FIG. 10. If the charge is successful (352), the system checks whether the number of items left is below the notification threshold (366). If the number is below the threshold, the system should only notify the seller that current left item number is below the threshold for the first time and save the notification's date and time into the database (368). Meanwhile, the system checks whether the style is the implicit style (356), and, if yes, the system checks whether quantity of items left is below the cleanout activation threshold (358). If yes, the system checks whether the activation condition (360) has been met. If it has been met, the cleanout process activates (370), and if it has not been met, the server will continue to verify.

When the current number of items left is above the cleanout threshold, the system starts aggregation. If the deal is implicit style, the apply implicit price calculate process (380) is started. If the deal is explicit style, the apply explicit price calculate process (385) is started. The detail of implicit price calculate process and explicit price calculate process will be explained below. Each membership's aggregation price will publish on field 140, and the aggregation price is not the final price for item, it just shows the price trend of the item to buyers.

The system updates the relevant information into the database (362), and notifies the user that the order is processed (364). The system creates or updates the record in buyer's table FIG. 14, including fields such as: Customer Name (2100), Deal ID (2200), Aggregation Period (2300), Order Time (2400), Quantity (2500), Single Item Price (2600), Prepaid (2700). If the charge fails, the system notifies user that his credit was inadequate (354).

FIG. 11 is the diagram of the rebate process. After the rebate waiting period, the rebate process calculates the final aggregation price and credits the difference back to the customer's preferred account. The method used differs based upon whether the deal I explicit or implicit style. Explicit style uses the max aggregation sold number during the aggregation period from start time to the end time. Implicit style only counts the max aggregation sold number in the period, starting with the date that the buyer ordered the product. According to the choice style, the system applies the implicit style calculation process 380 or explicit style calculation process 385. The credit total amount equals (the purchase price minus the final aggregation price) multiplied by the quantity. The system updates the database information 390 and notifies the credit event 395. In FIG. 15, the system updates the buyer's table on Aggregation sold Number (2800), Final Aggregation Price (2900) and Rebate Credit (2950).

FIG. 12 shows the price calculation process in implicit style. The process 380 is demonstrated as follows. When the rebate process starts, the first step 400 is to retrieve the buyer's information, such as: the purchase date, aggregation period, the quantity, and prepaid price from the buyer table. In a next step 410, to determine the max aggregation sold number in aggregation period, the system counts product sold number for a sequential aggregation period, which must include the order date:

For instance, Sam Daily (ref FIG. 15, 2217), who has membership A, entitles aggregation period as 1 day (2318).

The system counts the product sold number:

1. From: 1-day period prior to the time ordered,
2. From: 1-day period after the time ordered.

The larger of the two numbers will be the aggregation sold number.

Referring to FIG. 15, Sam Daily purchases the product on Oct. 12, 2004 (2417). Oct. 12, 2004 is the beginning of the deal, no prior record happened before this date. The sale style is implicit.

On Oct. 12, 2004, five units were sold 5 (501). On Oct. 13, 2004 three units were sold (502). Buyer Sam Daily bought 1 unit (2517) and prepaid the unit for $345.00(2618). The aggregation sold number is calculated, where Agg ( ) represent the aggregation sold number and Num ( ) represent the sold number on specific date. FIG. 16 shows the daily sold record information as in FIG. 17.

Agg(Oct. 12, 2004-Oct. 13, 2004)=Num(Oct. 12, 2004)+Num(Oct. 13, 2004)=5(501)+3(502)=8 (2817);

If Sam Daily purchases 50 items, the instant unit price will be $330.00 instead of $345.00.

Buyer Jack Mackin (ref FIG. 15, 2218) purchases the product on Oct. 22, 2004. Quantity is 1. The sale style is in implicit style.

On Oct. 22, 2004 six items were sold (ref FIG. 17, 511), and on Oct. 21, 2004 fourteen items were sold (ref FIG. 17, 510). On Oct. 23, 2004 seventeen items were sold (ref FIG. 17, 512).

Agg(Oct. 21, 2004-Oct. 22, 2004)=6+14=20;

Agg(Oct. 22, 2004-Oct. 23, 2004)=6+17=23,

Because Agg (Oct. 22, 2004-Oct. 23, 2004)>Agg (Oct. 21, 2004-Oct. 22, 2004), Buyer Mackin's aggregation sold number is 23(2818).

Buyer, who has membership B, entitles aggregation period as 7 day.

The system counts all possible sequential 7-day aggregation period, which must include the order date, as following case:

1. From: the 6 day period prior to the time ordered
2. From: 5 days prior to the time ordered to the 1 day after time ordered.

3. From: 4 days prior to the time ordered to the 2 days after time ordered.

4. From: 3 days prior to the time ordered to the 3 days after time ordered.

5. From: 2 days prior to the time ordered to the 4 days after time ordered.

6. From: 1 day prior to the time ordered to the 5 days after time ordered.

7. From: the time order and including the 6 day period after the time ordered.

The aggregation sold number will be selected as the case that results in the highest number.

Buyer Alex Donald (2101) purchases the product on Oct. 12, 2004 (2401). Quantity is 1. Oct. 12, 2004 is the beginning of the deal, and no prior record happened before this date. His Aggregation period is 7 days (2310). The sale style is implicit.

Agg(Oct. 12, 2004-Oct. 18, 2004)=Num(Oct. 12, 2004)+Num (Oct. 13, 2004)+Num(Oct. 14, 2004)+Num(Oct. 15, 2004)+Num(Oct. 16, 2004)+Num(Oct. 17, 2004)+Num(Oct. 18, 2004)

Agg(Oct. 12, 2004-Oct. 18, 2004)=5+3+7+3+12+15+9=53

Buyer Alex Donald's aggregation sold unit number is 53.

Buyer Emma Natasha (2110) purchases the product on Oct. 25, 2004(2410), and her quantity is 1 (2510).

From 6 days prior to Oct. 25, 2004 to the order time Oct. 25, 2004:

Agg(Oct. 19, 2004-Oct. 25, 2004)=98(3108);

From 5 days prior to Oct. 25, 2004 to 1 day after Oct. 25, 2004:

Agg(Oct. 20, 2004-Oct. 26, 2004)=87(3109).

From 4 days prior to Oct. 25, 2004 to 2 days after Oct. 25, 2004:

Agg(Oct. 21, 2004-Oct. 27, 2004)=84(3110).

From 3 days prior to Oct. 25, 2004 to 3 days after Oct. 25, 2004:

Agg(Oct. 22, 2004-Oct. 28, 2004)=81(3111).

From 2 days prior to Oct. 25, 2004 to 4 days after Oct. 25, 2004:

Agg(Oct. 23, 2004-Oct. 29, 2004)=96(3112);

From 1 day prior to Oct. 25, 2004 to 5 days after Oct. 25, 2004:

Agg(Oct. 24, 2004-Oct. 30, 2004)=89(3113);

From the order time of Oct. 25, 2004 to 6 days after Oct. 22, 2004:

Agg(Oct. 25, 2004-Oct. 31, 2004)=91(3114);

The max aggregation sold number among Agg (Oct. 19, 2004-Oct. 25, 2004), Agg (Oct. 20, 2004-Oct. 26, 2004), Agg (Oct. 21, 2004-Oct. 27, 2004), Agg (Oct. 22, 2004-Oct. 28, 2004), Agg (Oct. 23, 2004-Oct. 29, 2004), Agg (Oct. 24, 2004-Oct. 30, 2004), Agg (Oct. 25, 2004-Oct. 31, 2004) is:

Agg(Oct. 19, 2004-Oct. 25, 2004)=98.

Emma Natasha's aggregation sold number is 98.

If the buyer belongs to membership C or membership D, the rule is same, except the aggregation periods are different.

For buyers who belong to membership C, the aggregation sold number is 212 (3308). For buyers who belong to membership D, the aggregation sold number is 334.

In a third step 420, the aggregation sold number is applied to the price list to determine the final aggregation price, which equals (prepaid price minus final aggregation price) multiplied by the quantity.

Emma Natasha' aggregation sold number is 98. Applying the price list (1603), final aggregation price is $330(2910), and she is credited $15.00 (2960) back to her account.

In a fourth step 430, the system credits the total back to the buyer's preferred account, updates the database and notifies the customer.

During Nov. 1, 2004 (ref FIG. 16, 3005), the total left item number is below the notification threshold 100 (1803). The seller was notified that the left item was less than notification threshold number 100 (1803). The seller could confirm and update the total item available item or ignore the notification. If seller wants to re-supply the product, after seller confirms that more items are available (for example, if seller confirms that there is another 100 unit items are available), the total offered items will be updated in step 434.

The seller has a choice to edit the published item information at anytime when seller has logged in. The seller will not be able to update the total item number when cleanout is activated, unless the seller decided to continue the deal and update total number of items with cleanout price as prepaid price.

The Cleanout is activated on Nov. 7, 2004 if seller did not confirm more items are available upon the notification threshold event. On Nov. 7, 2004, the number of items left is less than 50, the cleanout is activated and the item price will be the price whichever less between the bulk price and cleanout price. The final aggregation price will be the price that is less between the cleanout price and aggregation price from the price list.

FIG. 13 shows the price calculation process in explicit style. The process 385 starts the rebate process in a first step 405 by retrieving buyer's information, aggregation period, the quantity, single item price and prepaid price.

In a second step 415, the explicit style process determines the number of items sold during the aggregation period, which is the time of the deal for explicit style. The method is based on implicit style without the requirement that the period must include the purchase date. Instead, the period is from the start of the deal to the end. The maximum aggregation sold number would apply for the membership. In explicit style, the final aggregation price is not influenced by the order date, as with implicit style. The price match is not needed in explicit style as with implicit style. This is demonstration as following:

Alex Donna has membership B, and the aggregation period is 7 days (ref FIG. 15, 2301). Alex Donna ordered product on Oct. 12, 2004 (ref FIG. 15, 2405) and his quantity is 1. The system applies the max aggregation sold number among the aggregation periods from Oct. 12, 2004 to Nov. 10, 2004.

As shown in FIG. 16, the max sequential 7 days aggregation period happened from Oct. 27, 2004 (ref FIG. 16, 3004) to Nov. 2, 2004 (ref FIG. 16, 3005). The aggregation sold number is 102 (ref FIG. 16, 3204). All buyers who are in membership B entitle the same aggregation sold number as Alex Donna, in another words, all membership B buyers receive the same price.

In a third step 420, the system will apply the max aggregation sold number 102 (ref FIG. 16, 3204) to seller's price list (ref FIG. 14, 1601), so all buyers with membership B are entitled to the same aggregation sold number, which equals 102.

Determining the final aggregation price, the total credit amount equals (prepaid price minus final aggregation price) multiplied by quantity.

Alex Donna's aggregation sold number is 102, and this number applies to the price list (ref FIG. 14, 1601), final aggregation price is $315 (ref FIG. 15, 2701) and credited $30 (ref FIG. 15, 2951) back to her account.

In a fourth step 430, the system credits the total back to the buyer's preferred account, updates the database and notifies the customer.

FIG. 14 shows the exemplary seller table stored in the server. The table is corresponding to information discussed with reference to FIG. 2 which was the Seller submit information page, such as Deal ID (1000) is a unique number identifying the deal. No duplicates are allowable, although one seller could have multiple deals, Seller (1100) is a description of the seller, Product (1200) is the product that seller posted to sell and it contains the information of description of the product detail and picture of product supplied by seller. Start Date (1300) is the time of seller wishes to publish online (If seller didn't specify the start date, the default value is the time when system server publish on web.), End Date (1400) (for implicit mode) is the time of seller wishes to stop the sale, Quantity (1500) is the total number of items the seller wishes to sell, Price List (1600): refers to the defined Price List, defined by seller, Model (1700) chosen by seller when seller submits the sale style (the different style leads the different approach towards to count the aggregation number and final price), Notify threshold (1800), Cleanout Threshold (1900) and Cleanout Price (2000).

FIG. 15 shows the exemplary buyer table, the information store in system server. The table contains: Customer (2100) is the description of buyer, Deal ID (2200) is the unique number to identify the deals from the seller, Aggregation Period (2300), Order Time (2400), Quantity (2500), Single Item Price (2600), Prepaid Price (2700), Aggregation sold Number (2800), Final Aggregation Price (2900), Rebate Credit (2950). The table contains example records to demonstrate difference between explicit and implicit style when buyers purchase at different times and with difference memberships.

For Explicit Style:

Membership B (7 day aggregation period) buyer: Alex Donald (2101) purchase one item at the beginning of the deal Oct. 12, 2001, and Collin Fuller (2103) purchase one item at the end of the deal Nov. 10, 2001, the aggregation sold number is the same, thus the final price and rebate are the same.

The difference in purchase time has no impact on the final price and rebate.

With membership C (15 day aggregation period), buyer Bob Sander (2014) and Nancy Mig (2016) share the same final price and rebate credit. Comparing that to the buyer with membership B (7 day aggregation period), the membership C buyer is entitled to a larger aggregation sold number and cheaper final aggregation price.

For Implicit Style:

Membership B (7 day aggregation period) buyer has a difference in aggregation sold number when buyers purchase items at different times. It may result in a difference in final aggregation price and rebate.

Compare that to the buyer with membership B (7 day aggregation period), the membership C entitles the buyer to larger aggregation sold number and a cheaper final aggregation price.

FIG. 16 shows the exemplary table of implicit style aggregation table for 7 days.

Date: shows the date time.

Unit Sold: shows the unit sold within that date.

Total unit sold (7 days aggregation After Order Date): the sum of sequential 7 days total unit number.

For example on Oct. 25, 2004 (ref FIG. 16, 3003), total units sold (7 days aggregation after Order Date) equals 91. The result is sum of units sold from Oct. 25, 2004 to Oct. 31, 2004.

Implicit mode Aggregation sold number: the max aggregation sold number within the 7-day aggregation sold number. For example on Oct. 25, 2004, total sold unit (7 days aggregation after Order Date) is 91, but the Aggregation sold number is the 98, which is the sum of units sold from Oct. 19, 2004 to Oct. 25, 2004.

FIG. 17 shows the exemplary table of implicit style aggregation table for 15 days, same definition as above except the aggregation period is 15 days.

FIG. 18 shows the exemplary explicit style aggregation table and conclusion from FIG. 16 and FIG. 17.

From FIG. 16, the max 1 day period unit sold is 23; max 7 day period unit sold is 102.

From FIG. 17, the max 15 day period unit sold is 212 and the total sold within 30 days unit is 334.

The embodiments and variations shown and described herein are merely illustrative of the principles of this invention. Various modifications may be implemented without departing form the scope and spirit of the invention.

I claim:

1. A method for aggregating sales of a product comprising the steps of:
    displaying product information to a buyer including a price on a display;
    charging the price to the buyer through a computer network and shipping the item to the buyer in response to the buyer selecting the product for purchase; and
    electronically providing a rebate to the buyer, the rebate calculated by determining the aggregation of sales of the product to the buyer and to other buyers occurring over a time period and comparing the aggregated sales number to a price sheet listing aggregated sales numbers cross-referenced to discounted sales prices;
    wherein the time period is a predetermined time period of a fixed number of days; and
    wherein the predetermined time period is selected from a rolling period of time that either starts with, includes, or ends with the date of sale of the product that generates the highest aggregated sales for the product.

2. The method of claim 1 wherein the time period is limited by a maximum number of days.

3. A method for aggregating sales of a product comprising the steps of:
    displaying product information to a buyer including a price on a display;
    charging the price to the buyer through a computer network and shipping the item to the buyer in response to the buyer selecting the product for purchase; and
    electronically providing a rebate to the buyer, the rebate calculated by determining the aggregation of sales of the product to the buyer and to other buyers occurring over a time period and comparing the aggregated sales number to a price sheet listing aggregated sales numbers cross-referenced to discounted sales prices;
    wherein the time period is a predetermined time period of a fixed number of days; and
    wherein a length of the predetermined time period differs based upon a membership level attained by the buyer.

4. The method of claim 3 wherein the time period is limited by a maximum number of days.

5. A method for aggregating sales of a product comprising the steps of:
   displaying product information to a buyer including a price on a display;
   charging the price to the buyer through a computer network and shipping the item to the buyer in response to the buyer selecting the product for purchase; and
   electronically providing a rebate to the buyer, the rebate calculated by determining the aggregation of sales of the product to the buyer and to other buyers occurring over a time period and comparing the aggregated sales number to a price sheet listing aggregated sales numbers cross-referenced to discounted sales prices;
   wherein the time period is selected from a rolling window of a predetermined number of days, the rolling window selected from between a start time and an end time determined by when an available quantity of products has been sold.

6. The method of claim 5 wherein the predetermined number of days is determined by a membership level attained by the buyer.

7. A system for aggregating sales of a product comprising:
   means for displaying product information to a buyer including a price;
   means for charging the price to the buyer and shipping the item to the buyer in response to the buyer selecting the product for purchase; and
   means for providing a rebate to the buyer, wherein the means calculates the rebate by determining the aggregation a sales of the product to the buyer and to other buyers occurring over a time period and comparing the aggregated sales number to a price sheet listing aggregated sales numbers cross-referenced to discounted sales prices;
   wherein the time period is a predetermined time period of a fixed number of days; and
   wherein the predetermined time period is selected from a rolling period of time that either starts with, includes, or ends with the date of sale of the product that generates the highest aggregated sales for the product.

8. The system of claim 7 wherein the time period is limited by a maximum number of days.

9. A system for aggregating sales of a product comprising:
   means for displaying product information to a buyer including a price;
   means for charging the price to the buyer and shipping the item to the buyer in response to the buyer selecting the product for purchase; and
   means for providing a rebate to the buyer, wherein the means calculates the rebate by determining the aggregation of sales of the product to the buyer and to other buyers occurring over a time period and comparing the aggregated sales number to a price sheet listing aggregated sales numbers cross-referenced to discounted sales prices;
   wherein the time period is a predetermined time period of a fixed number of days; and
   wherein a length of the predetermined time period differs based upon a membership level attained by the buyer.

10. The system of claim 9 wherein the time period is limited by a maximum number of days.

11. A system for aggregating sales of a product comprising:
    means for displaying product information to a buyer including a price;
    means for charging the price to the buyer and shipping the item to the buyer in response to the buyer selecting the product for purchase; and
    means for providing a rebate to the buyer, wherein the means calculates the rebate by determining the aggregation of sales of the product to the buyer and to other buyers occurring over a time period and comparing the aggregated sales number to a price sheet listing aggregated sales numbers cross-referenced to discounted sales prices;
    wherein the time period is selected from a rolling window of a predetermined number of days, the rolling window selected from between a start time and an end time determined by when an available quantity of products has been sold.

12. The system of claim 11 wherein the predetermined number of days is determined by a membership level attained by the buyer.

* * * * *